Patented Mar. 4, 1930

1,749,378

UNITED STATES PATENT OFFICE

RALPH T. GOODWIN, OF ELIZABETH, NEW JERSEY, ASSIGNOR TO STANDARD OIL DEVELOPMENT COMPANY, A CORPORATION OF DELAWARE

BRIQUETTE

No Drawing.    Application filed February 18, 1926.    Serial No. 89,060.

This invention relates to improvements in briquettes, especially fuel briquettes comprising a more or less finely divided carbonaceous material and a binder. In accordance with the invention an improved binder is used, namely, the solid or semi-solid carbonaceous substance produced from hydrocarbon oils in the manner disclosed in my application Serial No. 89,059, filed of even date herewith. The present application is a continuation in part of my applications Serial No. 3,595, filed January 20, 1925 and Serial No. 25,941, filed April 25, 1925, now Patent Nos. 1,660,294 and 1,660,295, granted February 21, 1928.

As described in the applications mentioned, oils characterized by the tendency to deposit slowly carbonaceous sediment on standing are treated with a carbon-precipitating or separating reagent. The oils especially adapted for the purpose are heavy residues from oil cracking equipment, such as pressure stills, cracking coils, and the like. Other oils that tend to deposit carbon or carbonaceous sediment in an analogous manner, for example semi-cracked material such as crude still tar, are also suitable. The precipitating or separating reagent is preferably an acidic body which may be dilute sulfuric acid, say of about 30° Bé. and in amount about 0.5% by volume of the oil. The oil and acid are thoroughly mixed. A rapid precipitation of carbonaceous material occurs and this material is then separated from the oil.

As disclosed in my Patent No. 1,660,295, above referred to, other acidic materials may be used instead of sulfuric acid, for example, dilute hydrochloric acid, dilute acetic acid, and dilute solutions of salts, such as sodium acid sulfate or aluminum sulfate, which hydrolyze to form acids.

A typical ultimate analysis of the precipitated carbon, prepared according to the present invention, is given below:

|  | Per cent |
|---|---|
| Carbon | 85.15 |
| Hydrogen | 4.98 |
| Ash | 2 |
| Oxygen, nitrogen and sulfur (by difference) | 7.87 |

The oil treated for the production of this carbon was pressure tar (residuum from pressure distillation of hydrocarbon oil) and had a gravity of 17° A. P. I.

The percentage composition of the carbon product will vary somewhat with the nature of the oil from which it is prepared, but the percentages are generally of the same order as those just given. The acid-precipitated product contains a lower percentage of carbon and of hydrogen than the material which slowly settles out from the oil on standing without acid treatment. The acid-precipitated product settles out rapidly from heavy oil in which it has been suspended by shaking or the like. In this respect, among others, it is different from lamp black, asphalt, and allied substances.

After extraction with carbon disulfid, the produce remaining undissolved had the following composition:

|  | Per cent |
|---|---|
| Carbon | 83.44 |
| Hydrogen | 4.89 |
| Ash | 2.84 |
| Oxygen, nitrogen and sulfur (by difference) | 8.83 |

The carbon product before extraction is a black, tarry, semi-solid. It is fusible, but does not have a very definite fusing (melting) point. The fusing point may be between about 160° and 230° C., frequently approximating 175° C. The carbon product free from oil may be between 15 and 30% soluble in carbon disulfid; the average solubility in this solvent is around 23%. The portion insoluble in carbon disulfid does not have a melting point. The volatile matter in the unextracted carbon may average around 12% by weight.

As indicated by the analyses above, there is not a marked difference in percentage composition between the extracted and the unextracted carbon. There is, however, considerable difference in their physical characteristics. The components removed by carbon disulfid appear to be of asphaltic nature. The residue is mostly non-asphaltic. It may be said in general that the proportion of asphaltic and non-asphaltic matters in the precipitated carbon product is about 25:75.

I have found that the unextracted carbon product described above is an excellent briquette binder. When used with anthracite fines, for example, in the amount of about 6% by weight and briquetted according to usual practice, a hard, tough, weatherproof briquette results. The improved binder is characterized by high fuel value and low ash content. It has no substantial tendency to produce smoking, and the briquettes are not objectionably softened when in the combustion zone.

The briquetting method forms no part of the present invention. According to one suitable procedure, anthracite fines are dried and thoroughly mixed with the binder in the proper proportion. Kneading or mastication of the mixture is desirable. The mixture is then pressed and the briquettes so formed are cooled, if necessary. Carbonizing or other heat treatment of the briquettes is not an essential but much improves their quality. Such heat treatment may be given in any of the equipment well known in the art for that purpose. Heating to a point not very far above the fusing point of the binder, say to about 325° to 375° C., is sufficient for most purposes.

When subjected to a carbonizing temperature, the improved binder forms a coke which strongly cements together the particles of coal. Volatile matter expelled in the heating may be recovered as in usual practice. As suggested above, the binder has an inherent cohesiveness which makes it possible to dispense with heating or carbonizing in some cases.

The amount of binder will vary with the amount of pressure exerted by the press, the nature of the material briquetted, the subsequent treatment of the briquettes, and other factors. In general, the amount of binder will be within the range of 5 to 15% by weight of the material bonded. A high class briquette may be made from the binding material alone, but its bonding efficiency is best utilized in forming briquettes from other carbonaceous materials. Among these may be mentioned, besides the anthracite fines previously referred to, coke braize, carbonized lignite, charcoal, and allied materials.

I claim:

1. A briquette containing a carbonaceous material precipitated by an acidic reagent from heavy residues from oil cracking, said material being characterized by fusibility and partial solubility in carbon disulfid.

2. A briquette containing a carbonaceous material such as may be precipitated by an acidic reagent from heavy residues of hydrocarbon oil cracking, said material being characterized by a fusing point between about 160° and 230° C., and being about 15 to 30% soluble in carbon disulfid.

3. A briquette containing a carbonaceous material such as may be precipitated by an acidic reagent from heavy residues of hydrocarbon oil cracking, said material being characterized by a fusing point approximating 175° C. and being about 23% soluble in carbon disulfid.

4. A briquette containing a finely divided combustible bonded with a carbonaceous material precipitated by an acidic reagent from a heavy residue of oil cracking, said material being characterized by fusibility and partial solubility in carbon disulfid.

5. A briquette containing a finely divided combustible bonded with a carbonaceous material precipitated by an acidic reagent from a heavy residue of oil cracking, said material containing asphaltic and non-asphaltic components, said asphaltic components being characterized by fusibility and the production of a bonding substance when subjected to heat.

6. A briquette containing a finely divided combustible bonded with the thermal decomposition residue of the asphaltic constituents of a carbonaceous material precipitated by addition of an acidic substance to a heavy residuum of oil cracking, said material containing also non-asphaltic constituents.

7. A briquette containing anthracite fines and about 5 to 15% by weight of carbonaceous material precipitated by addition of a small quantity of sulfuric acid to a heavy residue of oil cracking, said material being characterized by fusibility and partial solubility in carbon disulfid.

RALPH T. GOODWIN.